June 12, 1945.    R. J. MELLIEN    2,377,954
CAMERA
Filed July 3, 1943

Inventor:
Raymond J. Mellien
by Clarence E. Mehr
his Attorney

Patented June 12, 1945

2,377,954

UNITED STATES PATENT OFFICE 2,377,954
CAMERA

Raymond J. Mellien, Lake Geneva, Wis.

Application July 3, 1943, Serial No. 493,377

1 Claim. (Cl. 95—44)

This invention relates to certain new and useful improvements in cameras and more particularly to lens changing especially adapted to motion picture cameras and has for its principal object the provision of an improved structure of this character which will be highly efficient in use and economical in manufacture.

I am aware of the fact that it is known in the art of cameras to provide a multiple of lenses each having different focal length. Such cameras with which I am familiar being of the turret type, (that is with the lens mounted upon a turret) require a substantial reconstruction of the camera face in order to associate the multiple lens mounting therewith.

Another objection to this type of multiple lens mounting is found in the fact that such mounting cannot be used with those types of camera similar to the "Keystone" camera which because of their oblong face construction do not permit a turret mounting to be associated therewith.

It is therefore one of the many objects of this invention to provide a multiple lens mounting which may be associated with a standard camera without making complicated or extensive alterations, and a mounting which is especially adaptable to cameras of the "Keystone" type above described.

A still further object of my invention is the provision of a multiple lens and mounting therefor which is simple in construction and operation, one that may be attached to a standard type camera by one other than a skilled mechanic.

Other objects will appear hereinafter.

The invention consists in the novel combination and arrangement of parts to be hereinafter described and claimed.

The invention will be best understood by reference to the accompanying drawing showing the preferred form of construction, and in which.

Figure 1:
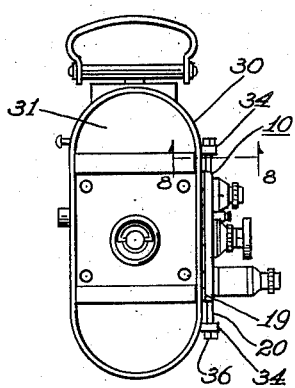
Fig. 1 is a side view of a camera showing my multiple lenses and mounting therefor associated therewith.
Figure 8:
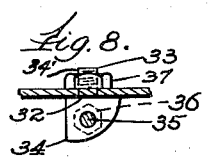
Fig. 8 is a detail sectional view taken substantially along line 8—8 of Fig. 1.
Figure 6:
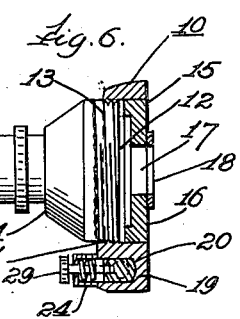
Fig. 6 is a detail view taken substantially along line 6—6 of Fig. 4.
Figure 2:
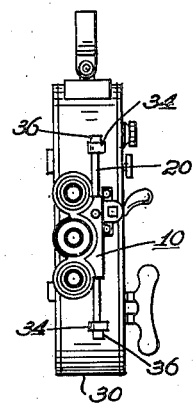
Fig. 2 is a front view of the same.
Figure 3:
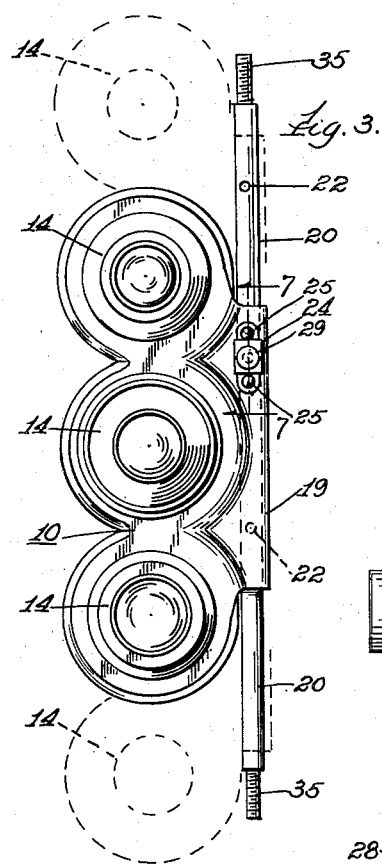
Fig. 3 is an enlarged face view of the multiple lenses and mounting as shown in Fig. 1.
Figure 4:
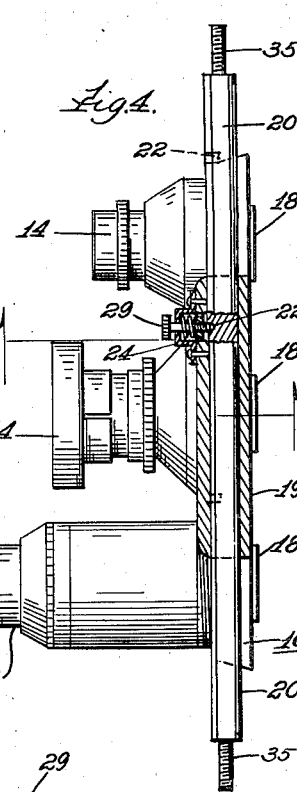
Fig. 4 is a side view of the same.
Figure 5:
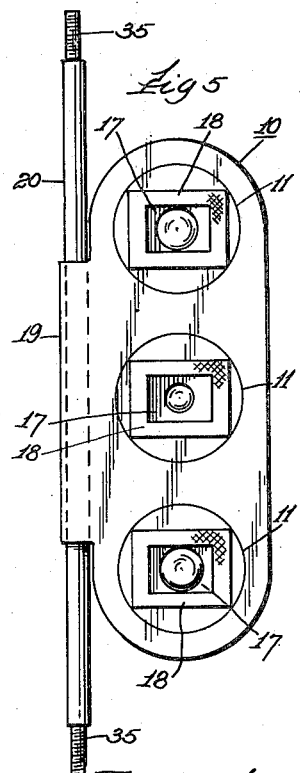
Fig. 5 is a rear view of the same.
Figure 7:
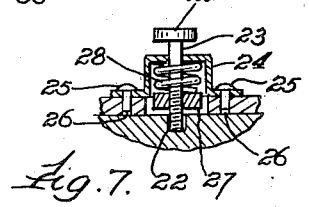
Fig. 7 is a fragmentary view taken substantially along line 7—7 of Fig. 3.

Being mindful that it is advantageous to provide an assembly of parts which can be mounted in place by the novice, I have kept in view the object of simplicity. In this connection my new and useful lens mounting comprises a mounting plate 10. This plate 10 has three aligned apertures 11 formed therethrough. These apertures 11 are threaded as at 12 designed to receive the threaded shank 13 of lens 14.

Each of these lenses 14 are of different focal length so that in use a selection of the proper lens for the right focal length may be made to meet such requirements as the moment may demand.

The base 15 of each of the apertures 11 receives a plug 16 having an aperture 17 of reduced portion to that of the apertures 11 formed therein. This aperture 17 is adapted to align with the camera light aperture (not shown).

To assure against light infiltration between the lens mounting plate 10 and the wall of the camera around the light aperture I provide if necessary on each plug 16 around the aperture 17 a relatively thin washer 18 made of felt or other soft material.

The lens mounting plate 10 along one longitudinal edge thereof is formed to provide a sleeve 19 of rectangular formation in cross section. Mounted on this sleeve is a guide rod 20 also rectangular in cross section and upon which the lens mounting plate 10 is slidable.

The guide rod 20 has formed thereon at predetermined points keeper notches 22 (there being three such notches in the present structure). Adapted to selectively engage the notches 22 is a keeper pin 23. The pin 23 is carried by a cap or bracket 24. This bracket 24 may be secured to the wall of the plate 10 by pins 25 driven for tight fit into opening 26. On the thread end of the keeper pin 23 is a nut 27. Between this nut 27 and the bracket, there is mounted upon the pin 23 an expansion spring 28 which functions to project the keeper pin 23 into the selector keeper notch 22.

To complete this construction the keeper pin is provided with a finger button 29.

The simplicity of my invention will be appreciated from the fact that to mount the lens mounting plate 10 to the camera wall 30 of the camera 31 it requires the novice to provide but two openings 32 in this wall after which he projects through each of these openings the thread bearing end 33 of a stud 34', upon which is threaded the nut 37. This stud may be formed as a part of a bearing block 34. This bearing block 34 has projected therethrough a reduced thread bearing end portion 35 of the guide rod 20. To complete the mounting a nut 36 is threaded upon the end 35.

The device is now ready for use. To make a selection of the desirable or wanted lens with the required focal length, all the cameraman need do is withdraw the keeper pin 23 from the notch 22, shift the plate 10 in the direction to bring the lens desired over the camera light aperture, after which the lens mounting plate is latched in position by the keeper pin 23 engaging the keeper notch 22.

The lens mounting may be used with cameras which, because of their shape and construction, will not permit of the known turret mounting for multiple lens.

While I have illustrated and described the preferred form of construction for carrying my invention into effect, this is capable of variation and modification without departing from the spirit of the invention. I, therefore, do not wish to be limited to the precise detail of construction set forth, but desire to avail myself of such variations and modifications as come within the scope of the appended claim.

Having thus described my invention, what I claim as new and desire to protect by Letters Patent is:

In a camera, a multilens plate having a plurality of openings, a lens mounted in each opening, a plug mounted in each opening and having an aperture formed therein of an area substantially less than the area of the opening, and a flexible washer member surrounding each aperture on the side of the plug opposite the lens.

RAYMOND J. MELLIEN.